June 10, 1930. F. O. ANDREWS ET AL 1,762,649
COMBINED AUTOMATIC BOLT POINTING AND THREADING MACHINE
Filed Oct. 10, 1924 10 Sheets-Sheet 3

Fig.3.

INVENTORS.
Franklin O. Andrews
BY Louis Steinfurth
ATTORNEYS.

June 10, 1930. F. O. ANDREWS ET AL 1,762,649
COMBINED AUTOMATIC BOLT POINTING AND THREADING MACHINE
Filed Oct. 10, 1924 10 Sheets-Sheet 4

INVENTORS.
Franklin O. Andrews
BY Louis Steinfurth
ATTORNEYS.

Fig. 8.

June 10, 1930. F. O. ANDREWS ET AL 1,762,649
COMBINED AUTOMATIC BOLT POINTING AND THREADING MACHINE
Filed Oct. 10, 1924 10 Sheets-Sheet 8

INVENTORS.
Franklin O. Andrews
BY Louis Steinfurth
ATTORNEYS.

June 10, 1930. F. O. ANDREWS ET AL 1,762,649
COMBINED AUTOMATIC BOLT POINTING AND THREADING MACHINE
Filed Oct. 10, 1924 10 Sheets-Sheet 9

INVENTORS.
Franklin O. Andrews
BY Louis Steinfurth
*Fray Oberlin + Fray*
ATTORNEYS.

Patented June 10, 1930

1,762,649

UNITED STATES PATENT OFFICE

FRANKLIN O. ANDREWS, OF WILLOUGHBY, AND LOUIS STEINFURTH, OF CLEVELAND, OHIO, ASSIGNORS TO THE ECONOMY ENGINEERING COMPANY, OF WILLOUGHBY, OHIO, A CORPORATION OF OHIO

COMBINED AUTOMATIC BOLT-POINTING AND THREADING MACHINE

Application filed October 10, 1924. Serial No. 742,771.

This invention relates to automatic machines of the metal working class, and refers more particularly to a new and improved machine of the type in which a plurality of forming tools, together with suitable work-holding and presenting mechanisms, are employed in connection with certain mechanism for containing and successively feeding blanks to such holding mechanism. In the present machine the forming tools are reciprocated to collectively engage the several blanks held in working position.

Our invention contemplates the provision of an automatically operated machine having a revoluble turret carrying a plurality of work-holding chucks and having a plurality of rotating tool spindles reciprocably mounted to co-operate with said chuck to efficiently and expeditiously produce finished articles from the rough blanks as they are continuously fed to the work-holding means. The machine herein provided is simple in construction, automatic in every operation, it being only necessary to keep the hopper supplied with blanks, and capable of producing a better quality of work in greater capacity than existing machines of the same general character. In securing this end we have devised the present novel machine in which are embodied certain important improvements capable of being utilized in machines other than the exact form disclosed herein.

An object of this invention is to provide, in connection with each of the several operating mechanisms of our machine, improved resilient means which are adapted to actuate such mechanisms in the forward or advanced movement thereof, the same being for the purpose of safety and of insuring all of the operating elements against breakage. It is not uncommon in machines of the present class which are adapted to perform upon rough blanks to have one of the blanks become misaligned in the chucks or even dislodged in the feeding mechanism whereupon serious injury is apt to occur to the machine or to the operator. With the present construction should a blank become out of place at any time in its travel through the machine the tool or part adapted to operate upon the blank at that place will merely engage the blank through the medium of its resilient actuating mechanism without injury to the mechanism or work.

The machine shown and described herein is especially designed for the handling of bolt blanks having a head at one end.

Another object of this invention is to provide an improved blank containing and feeding mechanism, which consists of a hopper in which is oscillatorily mounted a two-part blade adapted to position the bolt blanks with their heads upward and to then guide them to an inclined chute or guideway leading to the feeding mechanism. This blade is also provided with safety means which permits free movement of its operating mechanism should a blank become wedged in the hopper. A further object is to provide, adjacent to the lower end of the chute, intermittently actuated means which permit only one blank at a time to pass to feeding position. These means prevent the weight of the entire number of bolts in the chute from bearing against the lowermost blank therein which would interfere with its removal by the feeding mechanism.

A further object of this invention is to provide in connection with the threading die means for actuating the die in its advanced or threading movement at a rate of speed equivalent to the lead of the die threads, which construction overcomes the usual drag of the threading spindle and produces a more perfect thread on the formed article. To aid in the operation of the threading spindle this invention contemplates the provision of means for advancing the die under the tension of a strong spring until the threading elements have become engaged upon the work and to then employ means actuated by a comparatively lighter spring for maintaining the threading spindle in constant engagement with the lead actuating mechanism mentioned above.

Numerous other objects in the construction and arrangement of parts in the present novel machine will more fully appear in the following description and accompanying drawings, and will be especially pointed out in the annexed claims.

We have illustrated in the accompanying drawings a preferred embodiment of this invention which is especially adapted for pointing and threading bolt blanks. Referring to the drawings, the machine comprises a standard or bed 1, having a base 2, and a horizontal table 3 upon which are carried the several operating elements. The bed and table are recessed in the usual manner to catch the oil used in lubricating and cooling the cutting tools, and a removable pan 4 is carried beneath a recess 5 in the table 3 to receive the chips as they fall from the cutting operation, such pan of course being perforated to permit the oil caught therein to return to a sump in the bottom of the bed. Mounted on the top of table 3 in suitable bosses are supports or housings and mechanisms for holding a plurality of blanks and for forming such blanks into finished articles of the desired shape. The present machine is so designed to receive a number of blanks which are continuously and successively fed to the several work-holding mechanisms of a revoluble turret, in which position they are operated upon by a plurality of simultaneously reciprocated forming tools, which first reduce or point the ends of the blanks, and then cut suitable threads on the shanks thereof. Such tools are actuated in timed relation with the feeding and positioning of the blanks in the work-supporting turret so as to perform their entire functions upon the corresponding blanks during each reciprocation of the tools. In other words during each cycle of the operation of the machine one blank is being finished and discharged therefrom at one complete movement of the tools and a new blank is being simultaneously supplied in place of the discharged one. Means for actuating the moving parts of the machine consist of a driven pulley belted to any suitable source of power and having the necessary connections with such moving parts as described in detail hereinafter.

The operation of our novel machine is continuous, all of the parts being automatically controlled and moved in timed relation with each other. While the construction and operation of each of the several parts is quite simple, it is deemed advisable, due to the plurality of elements in this machine, to describe each division or class of elements separately for the sake of clearness and understanding in the following manner:

*The tool spindles and operating mechanism therefor*

Mounted on the table of bed 1, preferably at one side of the center thereof, is a bracket or supporting member 10 having spaced vertical bosses 11 and 12 projecting upwardly from each end thereof. These bosses are provided with aligned journal openings 13 and 14 in which are mounted the spindles of the forming tools. The axes of said tools are arranged longitudinally of the machine so as to approach the work as will later appear in the description under "Work-supporting turret."

Inasmuch as the present machine has been especially designed for pointing and threading bolt blanks it is necessary only to provide a pointing and a threading spindle. First taking the pointing spindle 19 which is here shown arranged above the threading element, it will be seen that such spindle is rotatably mounted in one set 13 of apertures in bosses 11 and 12, and has its forward end 15 projecting beyond the front side of boss 11, to support the pointing tool 16. This tool may be of any well known construction, the same in the present design being only for the purpose of reducing or rounding the end of rough blanks so that they may be properly engaged by the threading tool, it being obvious, however, that upon work of different character such tool may be readily replaced by any other tool, such as a reamer or the like.

Figure 1:
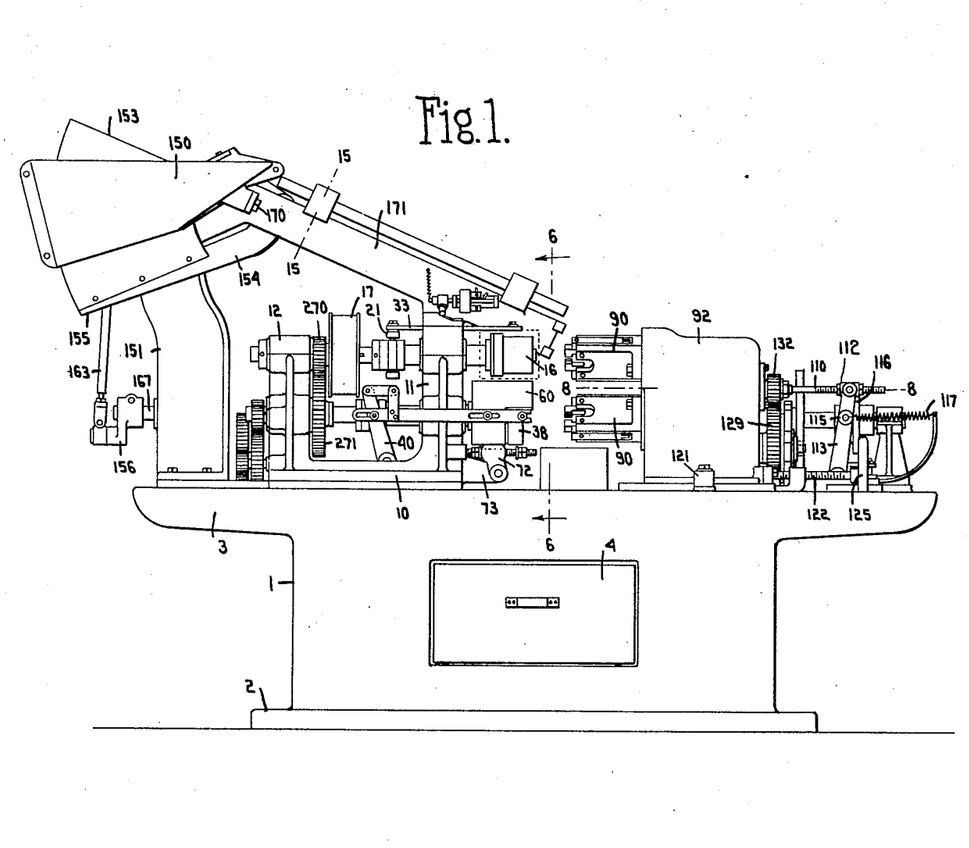
Fig. 1 is a front elevation of a preferred form of the combined machine embodying our invention.
Figure 2:
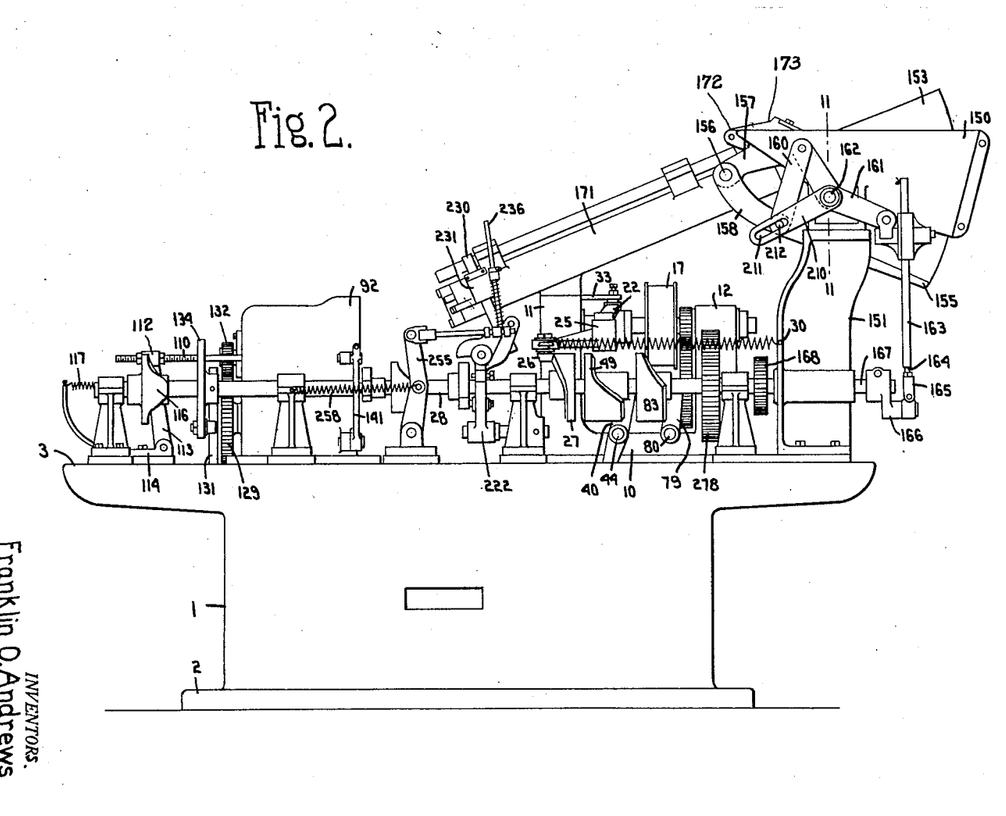
Fig. 2 a rear elevation of the same.
Figure 3:
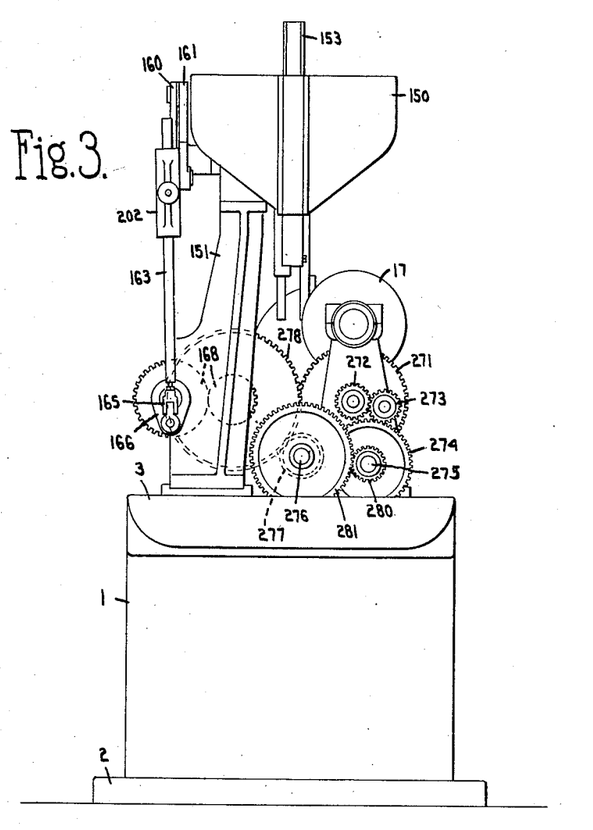
Fig. 3 an end elevation of the machine looking from the left in Fig. 1.
Figure 4:
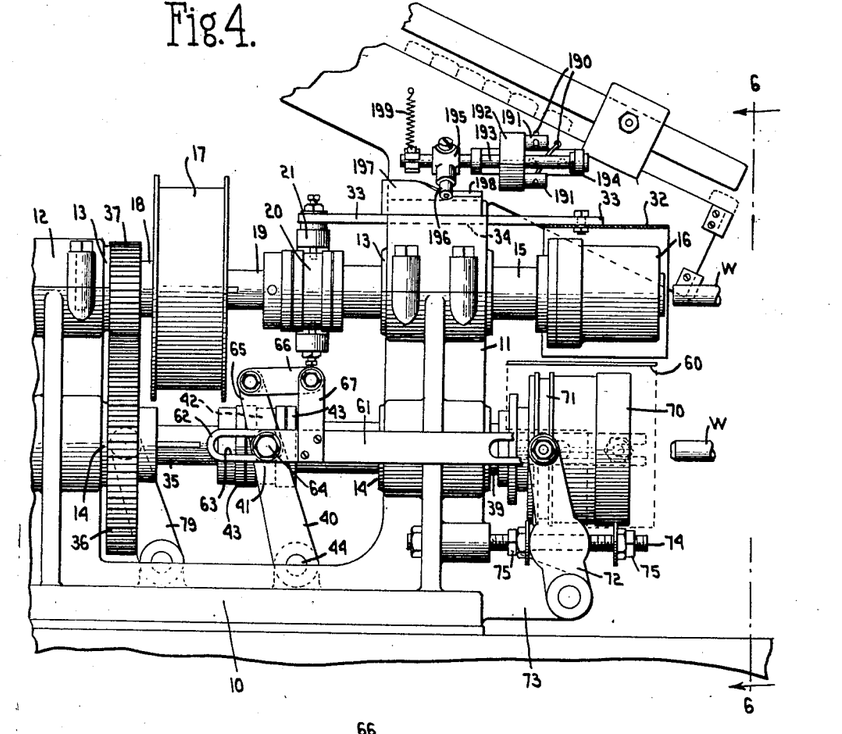
Fig. 4 a fragmentary view in elevation of the forming tools and operating mechanism therefor.

A driving pulley 17 is mounted on a sleeve 18 carried in the aperture 13 in the boss 12 and is adapted to rotate the pointing spindle shaft 19. The latter member is longitudinally slidable in the journals 13 in members 11 and 12, the usual form of key and slot being employed between such shafts and sleeve 18 to establish rotative engagement therebetween. As seen in Fig. 4 there is mounted on shaft 19 a collar 20 which is actuated by a yoke 21 to reciprocate the pointing spindle toward and away from the work, here shown at a bolt W. The means for actuating the yoke member 21 consists of an arm 22 pivotally mounted at 23 upon a bracket 24 projecting rearwardly from the boss 11. Also formed integral with arm 22 is a rearwardly extending arm 25 in the outer end of which is carried a cam roller 26 adapted to have suitable engagement with a cam 27. The cam 27 and cam shaft 28 will be more fully described hereinafter. A spring 29 is attached between the outer end of arm 25 and a bracket 30 mounted on the rear end of the machine, this spring serving to keep the cam roller 26 in engagement with cam 27 at all times. From an inspection of the Fig. 7 it will be seen that as cam 27 is rotated spring 29 will cause the arm 22 to move about its pivot and therefore carry the pointing spindle forward upon the work under the tension of such spring. This construction provides against the breaking of the spindle parts should the pointing tool improperly engage the work, at which time the spring will merely hold the pointing spindle until the trouble can be corrected. In the return movement of the spindle the yoked arm 22 is positively moved by the action of cam 27. A chip guard 32 is carried about the pointing tool upon a reciprocating rod 33 slidably received in a slot 34 in boss 11. The rear end of rod 33 is secured to yoke 21 so that the guard will be advanced in unison with the pointing tool.

The die spindle 35 mounted in journal apertures 14 in the bosses 11 and 12 is rotated by a spur gear 36 keyed thereon and meshing with a pinion 37 on the pulley drive sleeve 18. The spindle shaft 35 is also reciprocable in its journals so as to carry the threading die 38 into and out of engagement with the work, such die being carried on the outer end 39 of shaft 35. Means for reciprocating the die spindle consists of a pivoted yoke arm 40 having its yoked portion 41 engaging a collar 42 held between thrust bearings 43 on the die spindle. Arm 40 is pivoted at 44 in a boss formed on bracket 10 and has its lower extending end 45 engaged by a spring 46, the other end of which is secured in any suitable manner to the top of bed 1. It will be obvious that the action of spring 46 will cause arm 40 to rotate about its pivot so as to cause the die spindle to move forwardly. Carried at the upper end of yoke 41 on the rear side thereof is a cam roller 48 which projects into the path of a cam 49 on cam shaft 28. As this roller engages the cam it is moved rearwardly to retract the threading die spindle from the work. Cam 49 is provided with a second cam surface 50 which is so designed as to cause the die spindle to move forwardly at a rate of speed equivalent to the lead of the threading elements in the die. The spring 46 as well as carrying the die forward tends to keep the roller 48 in constant engagement with the lead surface 50 of cam 49, which construction relieves the usual drag of the threading elements as they are advanced upon the work and serves to produce a more perfect and uniform thread.

Also pivotally mounted about pivot 44 is a depending arm 51 extending substantially parallel to arm 45. At the front side of arm 51 is provided a laterally extending finger 52 adapted to overlie the corresponding side of the arm 45, it being obvious that movement in a rearward direction of arm 51 will cause the arm 45 to travel with it. Attached to the lower end of arm 51 is a comparatively heavy spring 53 which is at certain times adapted to actuate the die spindle under greater tension than that required during the threading operation. Such latter spring 53 functions with spring 46 to advance the die spindle during the first part of its movement, that is, before the threading elements are engaged properly upon the work, at which time suitable means in the form of an adjustable stop 54 act to relieve the rearward movement of arm 51. Further forward travel of the die is then accomplished by the spring 46.

Figure 5:
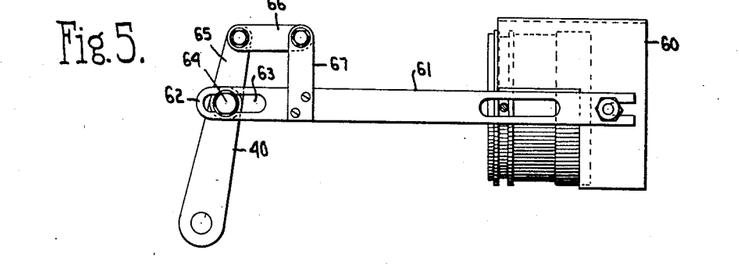
Fig. 5 a detail view of the die guard actuating mechanism.
Figure 6:
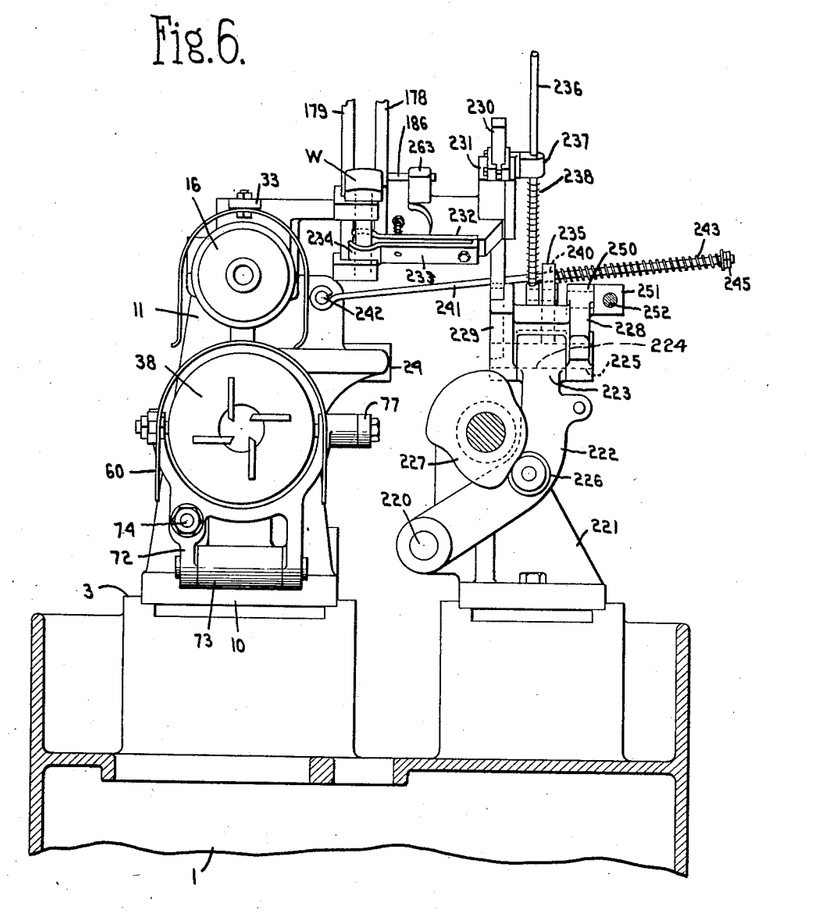
Fig. 6 a cross sectional view taken on line 6—6 in Figs. 1 and 4 looking in the direction of the arrows.

This invention contemplates the provision of a new and improved chip guard which is adapted to co-operate with the threading tool. In most machines of the metal working class which are adapted to cut away the metal of a rotating part, it is common to have the cut chips fly away from the point of operation which is annoying in all instances and of some danger to the operator. The chip guard 60 of this invention which is adapted to surround the threading die is retracted out of the way of the work when the die is in inoperative position but is so actuated that it will move at a faster rate of speed than the die in its forward or cutting movement. That is, as the die is being advanced upon the work, the chip guard 60, as best seen in Figs. 4 and 5, is accelerated in its movement to project beyond and encompass the threading elements during their engagement upon the work. The means illustrated for accomplishing this accelerated movement consist of a reciprocable link or bar 61 which is adapted to carry the chip guard 60 at its forward end. The rear end 62 of such bar is slotted at 63 and is engaged about the fulcrum bolt 64 which connects the arm 40 to the sliding collar 42 hereinbefore described. The arm 40 is extended considerably beyond the bolt 64 at 65 and has attached to its extreme end one end of a link 66. The other end of link 66 is pivotally attached to a projecting portion 67 provided on the bar 61. It will be apparent from the foregoing that the bar 61 carrying the chip guard is reciprocated by the movement of yoke arm 40 and that such bar 61 may be advanced at a faster rate of speed than the die spindle on account of its slotted engagement with the fulcrum bolt 64. Due to the difference in the radius between pivotal point 44 and the bolt 64 and such point and the outer extremity of portion 65 such outer portion will be caused to travel a greater distance than that of the die spindle, which results in the accelerated forward movement of the chip guard.

The threading die element illustrated in the specific embodiment of the invention shown is of the self opening and closing type, there being provided in connection with this invention suitable means which actuate to open the die when the proper length of thread has been cut upon the blank and to later close such die in preparation for its next advance upon the succeeding blank. The die proper consists of the usual annular housing 70 in which are pivotally carried the threading elements and of the usual opening and closing element in the form of a sliding sleeve 71, carried at the rear side of said die housing. The sleeve, as shown in Fig. 4, has just been moved forward by its actuating mechanism to close the threading elements. Such actuating mechanism comprises a pivoted yoke member 72 engaging around the sleeve 71 and having its lower end pivoted in a boss 73 at the front of the bracket 10. A rod 74 provided with adjustable nuts or stops 75 is used to insure the closing of the die at the proper moment. The elements described above are of well known construction and further detailed description is deemed unnecessary.

Means for opening the threading elements of the die after it has reached the completion of the threading operation are provided at the rear side of the threading die spindle and consist of a longitudinally extending bar or link 77 having its forward end secured to yoke member 72 and its other end pivotally attached to the upper end 78 of an arm 79. Arm 79 is pivotally mounted on bracket 10 at 80 and carries at its upper end 78 a cam roller 82 which is engaged at the proper time by a cam 83 on cam shaft 28.

Work supporting turret

As has been previously stated the machine disclosed in the present embodiment of our invention comprises means for holding a plurality of blanks in working position and for successively presenting such blanks to the several forming tools. The work holding means consists of a number of chucks 90 which are adapted to grip and hold the bolt blanks in longitudinal alignment with the pointing and the threading tools described hereinbefore. Such chucks are carried on the front end of a revoluble turret 91 which is carried in a housing 92 mounted on top of the bed table 3 at the opposite side of the center of the machine from the forming tools. These chucks, which in the current case are three in number, are so arranged that two of them are opposed to the forming tools during the forming operation while the third one is being relieved of the finished article and supplied with a fresh blank. There are three stations in the operation of the work holding or turret mechanism and these stations will be hereinafter called the loading or discharge station, pointing station and the threading station.

Figure 8:
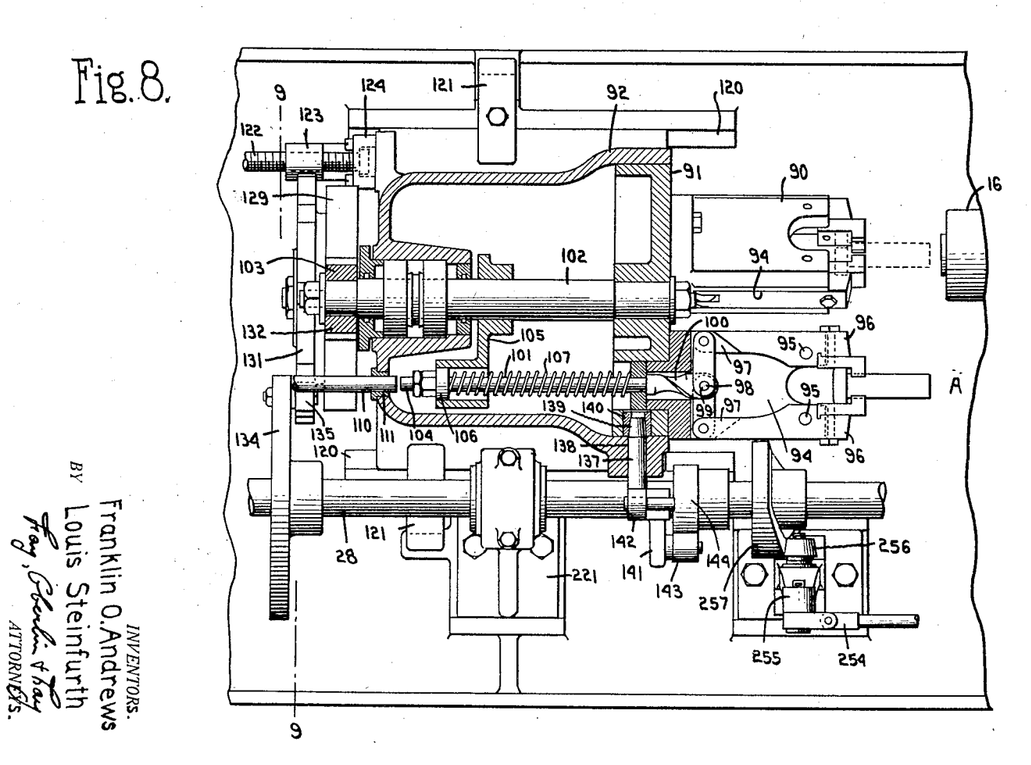
Fig. 8 a cross sectional view through the work-holding turret as taken on line 8—8 in Figs. 1 and 9.
Figure 9:
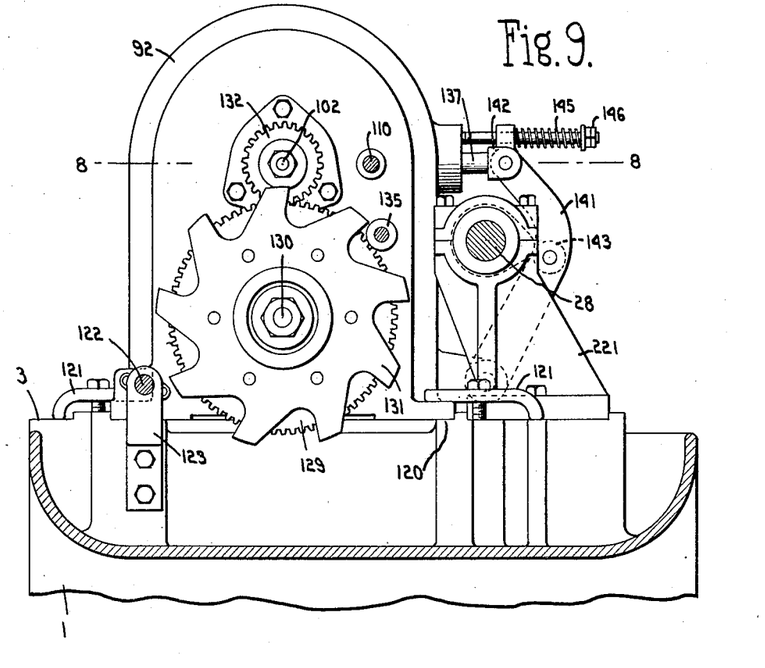
Fig. 9 a cross sectional view taken on line 9—9 in Fig. 8 showing the turret indexing mechanism.
Figure 10:
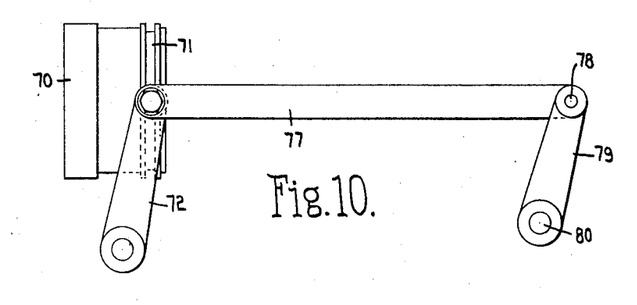
Fig. 10 a detail view of the die opening and closing mechanism.

The several chucks 90 are secured at spaced intervals to the front side of the turret, and since each of these chucks are identical in construction and operation only one will be described. Referring to Fig. 8, it will be noted that each chuck comprises a housing or bracket member having its forward side provided with longitudinal bifurcation 94 in which are pivotally mounted about pins 95 two gripping jaws 96. The forward ends of these jaws which project into the space between the turret and the forming tool are adapted to receive and hold the bolt blanks, while the other ends 97 of these jaws are attached to a toggle link connection 98. The toggle connection is connected at its joint 99 to the forward end 100 of a longitudinally extending rod 101 carried interiorly of the turret housing. It would be well to here state that the turret is rotatably mounted upon a central shaft 102 which has its rear end 103 journaled in the rear face of the housing and is actuated by suitable indexing mechanism, to be presently described, to advance each set of gripping jaws from one station to another.

The rear end 104 of the toggle actuating rod is extended adjacent the inner face of the turret housing, suitable means such as a spider 105 secured on the shaft 102 being provided to support such end of the rod from lateral displacement and also to provide guiding means for a cylindrical collar member 106. A compression spring 107 is carried on rod 101 between the collar 106 and the inner side of the chuck member 90, which spring tends to normally keep the rod 101 pressed rearwardly to retain the toggle 98 in closed position. Thus it will be seen that if a bolt blank should become misaligned or in any way dislodged in the gripping jaws the spring 107 which serves to actuate the jaws to closed position will yield and prevent injury to such gripping mechanism. In the position indicated at A in Fig. 8, the bolt is at the loading or discharge station at which time it is necessary to break the toggle connection and separate the gripping elements of the chuck to permit the bolt to be freely inserted between the jaws.

We have provided a single toggle or jaw actuating mechanism operable through the rear face of the turret housing which is adapted to operate upon each of the chuck mechanisms as they are brought to feeding or loading position. Such toggle actuating mechanism comprises a longitudinally reciprocable rod 110 having its forward end received in a suitable aperture 111 in the rear face of the housing 92 and having its other end provided with an adjustable collar 112 which is actuated by a yoked arm 113. Arm 113 is pivotally mounted on the table 3 in a boss 114 and carries intermediate its ends a cam roller 115 which is adapted to have engagement with a cam 116 carried on the cam shaft 28. A spring 117 is used to normally keep such cam roller in engagement with the cam and to also keep the actuating rod 110 in inoperative position.

This invention provides means by which the work holding turret may be adjusted longitudinally of the machine to accommodate various lengths of bolt blanks. The turret housing 92 is mounted upon suitable gideways 120 formed on the top of table 3 and is normally clamped into said position by two or more clamp members 121. Located at the rear end of the turret housing is an adjustable screw 122 carried in a boss 123 provided on the bed tables 3 and having its forward end rotatably received in a cap member 124 secured to the rear face of the turret housing. This cap member permits the adjusting screw to turn relative to the turret housing and also prevents any relative movement between such screw and the housing. A hand wheel 125 is provided at the outer end of the screw 122 and it will be seen therefore that any movement given to such wheel will tend to move the turret housing longitudinally in its guideways.

As previously stated means are provided for indexing the work holding turret from one station to another. In the present machine which has only three stations in one complete revolution of the tool turret, it is required to index the turret 120° from one station to the next. In metal working machines of the present class, it has been found that the most desirable mechanism for performing the indexing of a turret consists of the so called "Geneva" stop motion. Heretofore, in this class of machines the turrets have had four or more working stations and it was only necessary to turn such turrets 90° or less at each indexing and the Geneva sector was attached directly to the turret mechanism. To apply the Geneva motion to our machine, we have devised certain novel mechanism whereby a rotation of at least 120° may be given to a turret body while the actual rotative movement of the Geneva mechanism is less than 90°, the same being necessary to retain the operative elements of the machine within the limits of mechanical design.

Mounted on a stub shaft 130 carried in the turret housing 92 beneath the shaft 102 is the ordinary serrated Geneva sector plate 131. Also carried on stub shaft 130 is a large spur gear 129 meshing with a comparatively small pinion 132 mounted on the rear end of turret shaft 102. From this construction, it will be apparent that a relatively small movement of the Geneva sector will cause the turret shaft together with the work holding turret to index from one station to another, the same being of considerable advantage inasmuch as the throw of the Geneva sector actuating mechanism may be limited within a certain radius. Mounted on cam shaft 28 contiguous to sector plate 131 is an annular disk 134 carrying in a radial slot provided therein a roller 135 adapted to have engagement with the several serrations in the face of the sector plate to index the same from one position to another. As is usual in indexing mechanisms of the present character, this invention utilizes a turret locking bolt 137 which is adapted to hold the work holding turret in its various operating stations. Such bolt is herein shown as operable in an aperture 138 provided in the rear face of turret housing 92 and has its forward end 139 tapered to engage in tapered sockets 140 provided in the periphery of the turret 91. Means such as an intermittently actuated arm 141 having its upper end attached to the projecting portion 142 of the bolt 137 is employed to withdraw such bolt from locking position in timed relation with the operation of the indexing mechanism. The arm 141 carries intermediate its ends a cam roller 143 which is engaged by a cam 144 carried on cam shaft 28. The cam 144 merely serves to withdraw the locking bolt from engagement with the turret, other means in the form of a spring 145 being employed to force such locking bolt inwardly. This spring also tends to keep the cam roller 143 in constant engagement with the cam 144. The tension of the spring 145 may be adjusted by means of adjusting nuts 146.

*The hopper and operating mechanism therefor*

As briefly stated in the summary of the objects of this invention at the beginning of this specification, it is within the purview hereof to provide a hopper mechanism in which may be carried a plurality of bolts and which mechanism is adapted to continuously guide such bolts in proper position to a feeding mechanism. The hopper proper 150 is shown in the drawings as being carried at one end of the machine upon a bracket 151 secured to the top of tables 3. While it is understood that the general construction and operation of the present hopper mechanism is not broadly new, certain improvements have been applied in connection with the present machine which facilitate the operation thereof. The hopper consists of two half members 152 which are adapted to be secured together in any suitable manner and in which may be carried a great number of bolt blanks.

Figure 11:
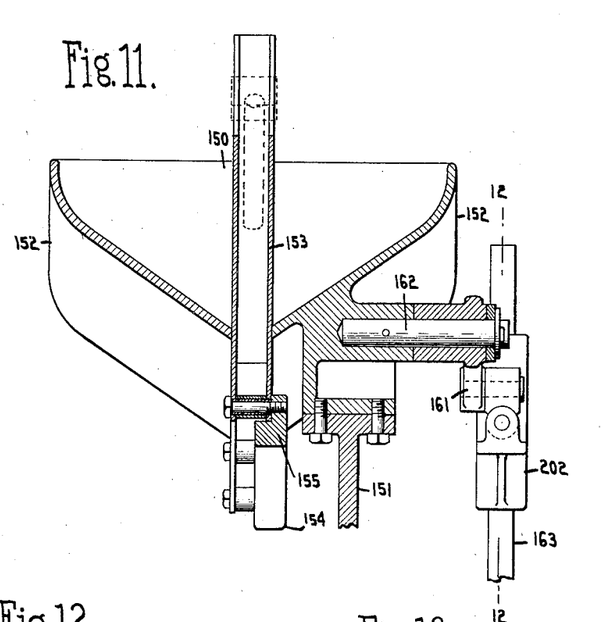
Fig. 11 a transverse sectional view through the hopper taken on line 11—11 in Fig. 2.

Operating between these two half members is a vertical oscillatory bolt separator blade 153 which is adapted to be intermittently oscillated through the hopper to agitate the bolts therein and pick up such bolts with their heads upward, the same being ordinary in this type of hopper. As seen in Fig. 11 blade 153 comprises a vertical member having its upper edge bifurcated for the reception of the bolt shanks, it being understood that such bifurcations are sufficiently restricted to prevent the head of a bolt from entering between the sides of the blade. Means for actuating the hopper blade 153 consists of an arm 154 having one end 155 attached to the lower side of the blade and having the other end pivotally mounted about a fulcrum pin 156 carried in a boss 157 on the hopper. Means for oscillating the pin 156 and arm 154 comprises an arm 158 having one end secured to such pin and having its other end attached by a link 160 to a bell crank arm 161 mounted about a pivotal pin 162 at the rear side of the hopper. The other end of the bell crank arm is attached by suitable connections to a reciprocating rod or bar 163 which has its lower end 164 secured by a universal joint connection 165 to a rotating crank 166. Crank 166 is carried at the end of a stub shaft 167 rotatably mounted in a suitable journal provided in the bracket member 151 and having its forward end geared to the cam shaft 28 through pinion gears 168. In operation as the cam shaft is rotated, the stub shaft 167 will cause the crank 166 to reciprocate bar 163, which in turn rocks the bell crank about its pivot and causes the intermittent oscillation of the hopper blade.

Attached to the front or discharge end of the hopper by suitable bolts 170 is an inclined guideway or chute 171 which has its upper surface arranged to lie in the plane of the upper surface of the hopper blade when the latter is in raised position. It will be seen therefore that such bolts as are carried by the hopper blade will slide therefrom onto the chute and thence to the feeding mechanism to be hereinafter more fully described.

Figure 13:
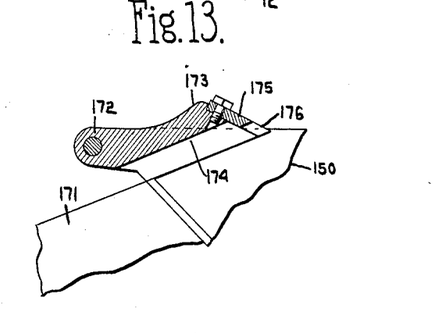
Fig. 13 a detail view of the hopper latch.

A latch or safety member 172 is provided adjacent the outlet (as best seen in Fig. 13) of the hopper which prevents any bolt which is not properly aligned for feeding position from entering or becoming jammed into the chute 171. The latch 172 comprises a pivoted member 173 having its under face 174 cut away to receive the heads of the bolts. To adapt the said latch for various sizes of bolts, suitable interchangeable plates 175 may be removably secured to the end thereof which plates are provided with an opening 176 to accommodate the heads of the bolts.

Figure 14:
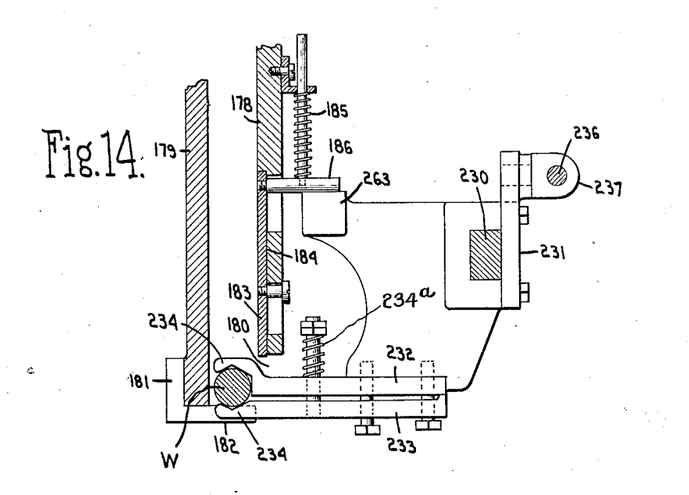
Fig. 14 an enlarged detail view of the blank feeding mechanism as taken on line 14—14 in Fig. 7.
Figure 15:
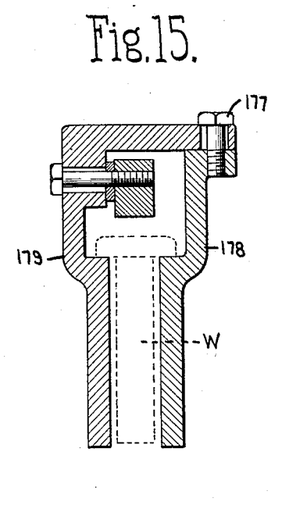
Fig. 15 a transverse sectional view through the hopper chute taken on line 15—15 in Fig. 1.

Chute 171 herein consists of two spaced members which are adjustably secured together by bolts 177 to accommodate various sizes of blanks. The lower end of the chute extends to a position adjacent the work holding mechanism from which position bolts are intermittently taken and fed to the chucks 90. Referring to Fig. 14 it will be seen that the rear side 178 or the one adjacent to feeding mechanism of the chute is cut away at 180 to permit the bolts to be withdrawn laterally from the chute. The other side 179 is provided at its lowermost end with one or more bracket members 181 having one side 182 extending into the path of the bolts to prevent their dropping from the chute. There is also provided in side member 178 near its lowermost end a sliding latch 183 which normally extends across the lateral opening 180 and prevents the displacement of the bolts. Such latch member is carried in a suitable guideway 184 cut in the inner face of member 178 and is normally held in closed position by a spring 185 engaging a pin 186 carried in said latch member.

Figure 16:
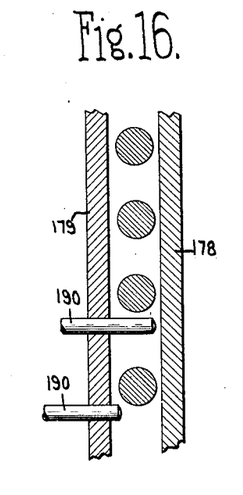
Fig. 16 is a detail longitudinal sectional view through the chute illustrating the bolt separator mechanism.

As has been hereinbefore stated, this invention has for one of its objects to provide certain mechanism which permit only one bolt at a time to pass from a point intermediate the ends of the chute to feeding position, the purpose of this construction being to prevent the weight of the entire number of bolts carried in the chute from bearing against the lowermost bolt therein as it is taken from the chute by the feeding mechanism. As best seen in Figs. 4 and 16, the separator mechanism comprises a pair of intermittently reciprocated pins 190 operating through the side 179 of the chute to engage the bolt shanks. The outer ends of these pins 190 are secured in diametrically opposed bosses 191 carried by an oscillating drum or collar member 192. This construction provides for the insertion of one of the pins 190 between the bolt shanks in the chute, while permitting the single bolt, which has been held by the other or lower pin to move downward in the chute. The next reciprocation of the pins allows another bolt to slide therebetween. Drum 192 is mounted on an oscillating shaft 193 carried by a bracket member 194 secured to the front face of side 179. Shaft 193 carries thereon a laterally projecting arm 195 having a cam roller 196 mounted at its end which is adapted to have engagement with a cam member 197 mounted on the top of reciprocating bar 33. It will be obvious that as the bar 33 is reciprocated back and forth, the surface 198 of the cam 197 will cause the shaft 193 to oscillate. A spring 199 attached to a suitable clamp member on shaft 193 is utilized to keep the cam roller in constant engagement with the cam 197.

Figure 12:
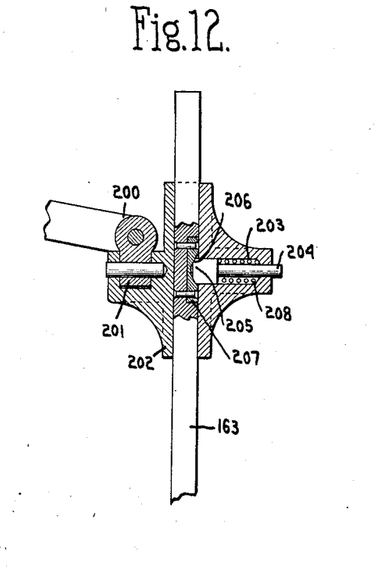
Fig. 12 a detail sectional view taken on line 12—12 in Fig. 11 illustrating the hopper actuating safety mechanism.

We have provided in the specific embodiment of the invention described and shown herein certain mechanism interposed between the bell crank arm 161 and the hopper actuating bar 163 which is adapted to prevent any undue strain or breakage occurring in the hopper actuating mechanism or in the hopper should a bolt at any time become improperly wedged in the hopper. Such safety mechanism referred to is automatic in operation and is so designed that driving relation will be automatically established between the hopper actuating bar 163 and the bell crank arm 161 upon the next reciprocation of said bar or at the time when the difficulty has been rectified. As best seen in Figs. 11 and 12, the end 200 of bell crank arm 161 is pivotally secured to a swivel joint member 201 which in turn is pivotally mounted in a sliding member 202. Member 202 is slidably mounted about the bar 163 and has provided in one side thereof a transversely extending aperture or recess 203. In recess 203 is carried a spring pressed plunger 204, the front face 205 of which is adapted to engage in an inclined recess 206 formed in the surface of the hopper actuating bar 163. A hardened plate 207 may be inset in the surface of such bar at this point as is shown in Fig. 12. Spring 208, which actuates the plunger 204, is of sufficient strength to normally maintain the driving relation between the sliding member 202 and the hopper actuating bar 163. It will be seen, however, that the present construction will permit the bar 163 to be moved relatively to the sliding member should any of the hereinbefore described parts become wedged, and such mechanism will automatically re-establish driving relation between such parts upon the next reciprocation of the bar through member 202.

We have also provided in the present machine another safety mechanism which is adapted to prevent the hopper blade from dropping completely out of the hopper should any of the fulcrum pins of the various actuating links therefor become sheared off, or in the event that the sliding member 202 moves beyond the end of the bar 163. The same is accomplished by merely providing a pivoted link member, which is so combined with the various operating elements mentioned above that the movement thereof will be limited beyond a certain degree. This link member is designated in the drawing by numeral 210 and has one end thereof pivotally secured about fulcrum 162. The other end is slotted at 211 and is adapted to receive in such slot the pin 212, connecting arm 158 to link 160. It will readily be seen that the downward movement of arm 158, and consequently the downward movement of the hopper blade, will be limited by the travel of pin 212 in slot 211.

*Blank feeding mechanism*

From the foregoing description it will be seen that the hopper and chute mechanism convey the bolt blanks to feeding position at an angle and that such bolts when held in the work-holding mechanism are arranged horizontally or longitudinally of the machine. Therefore it has been necessary to devise certain novel mechanism which is adapted to intermittently transfer the bolts from the chute to a position where they may be gripped by the chucks 90. Mounted on a stub shaft 220 in one of the cam shaft supporting brackets 221 is an upwardly extending arm 222 provided in its upper portion 223 with a transversely extending journal 224, in which is secured a pivotal pin 225. The arm 222 also carries a cam roller 226 adapted to engage with a cam 227 secured to shaft 28. Stub shaft 220 is arranged parallel with the axis of the cam shaft and therefore movement imparted to the arm 222 will cause the same to travel transversely of the chute 171. Carried by the pivotal pin 225 is a bracket member 228 provided with an offset portion 229 in which is secured a vertically projecting bar 230 that extends upwardly, and in feeding position is adapted to lie adjacent the end of the chute 171. Slidably mounted on bar 230 is a blank engaging means comprising a sliding member 231 to which is attached a set of blank engaging spring fingers. One of these fingers 232, as is seen in Fig. 14, is rigidly secured to member 231 and the other one 233 is yieldingly held by a spring 234A against the finger 232. The forward ends are provided with suitably shaped portions 234 to receive a bolt therein. Due to the peculiar arrangement of the various elements of the present machine, it is necessary to have the member 231 slidable with respect to its supporting bar 230, the purpose of which will presently appear.

Figure 7:
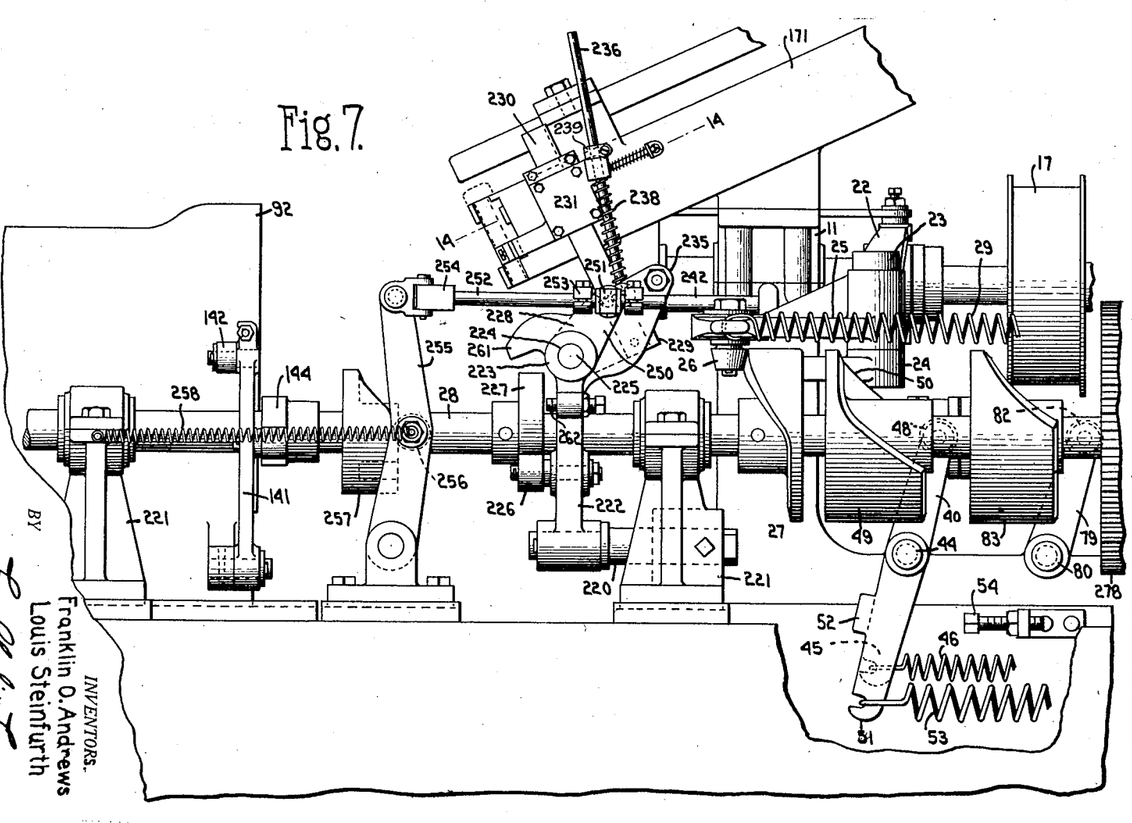
Fig. 7 an enlarged fragmentary view in elevation of the cam shaft and various operating elements actuated thereby.

The arm 222 is provided at its upper portion with a lateral projection 235, in which is secured one end of a rod 236 which passes upwardly through a pivotal connection 237 mounted on the sliding member 231. Surrounding the rod 236 is a compression spring 238 which tends to keep the sliding member 231 pressed upwardly, and as shown in Fig. 7, there is provided an adjustable stop 239 on the bar to limit the movement of the sliding finger carrying member 231. Projection 235 is also provided with an aperture 240 through which is passed the forward end of a rod 241. One end of rod 241 is carried by a projecting pin 242 secured in the front side of boss 11, such pin permitting certain oscillatory movement of the rod. A compression spring 243 is mounted on the opposite end of the rod 241 between the projection 235 and adjusting nuts 245 carried thereon for the purpose of keeping the arm 222 together with the spring fingers normally pressed inwardly, and for keeping the cam roller 226 in constant engagement with the cam 227.

The pivoted bracket member 228 is provided with another extending arm 250 in which is rotatably carried a swivel joint 251 through which passes a substantially horizontal rod 252. Adjustable clips 253 are provided at each side of the swivel member 251 for preventing relative longitudinal movement between the rod and the extending arm 250. The forward end of rod 252 is secured by a universal joint connection 254 to the upper end of an arm 255 pivoted at its lower end about an axis extending transversely of the machine. Such arm 255 also carries a cam roller 256 adapted to be operated upon by a cam member 257 secured on cam shaft 28. Means, such as a tension spring 258, is used to keep such arm 255 with its roller normally pressed toward cam 257.

The operation of the above described elements is quite simple and they function to first grip a bolt as it is held in the chute 171 and to then withdraw such bolt from the chute and convey it to a horizontal position where it may be gripped by the chuck mechanism 90. The parts are operated in timed relation with respect to the indexing mechanism, the various cams on the cam shaft 28 serving to accomplish such feeding at the proper interval. Assuming the parts being in position shown in Fig. 7, it will be understood that the inward movement of the arm 222, as caused by the action of spring 243 will carry the spring fingers into engagement with the lowermost bolt in the chute. These fingers as they come into engagement with the bolt are permitted by the spring 234A (Fig. 14) to separate until the gripping portions thereof surround the bolt. The cam 227 then functions to push the arm 222 together with the spring fingers which carry the bolt with them outwardly against the tension of spring 243, at which time the arm 255 may be actuated to bring the arm 222 and gripping mechanism carried thereby into a horizontal position. To accomplish this, the cam roller 256 engages the relieved portion 260 of cam 257 and permits the arm 255 to rock about its pivot to the left of Fig. 7. This movement will rock the pivoted bracket member 228 about the pin 225 and bring the bolt and its carrying mechanism to proper horizontal position. A projecting stop lug 261 is provided on one side of bracket member 228 which is adapted to engage an adjustable stop screw 262 carried in arm 222 to limit the downward movement of the bracket 228 and bar 230. After the bolt which has been carried in horizontal position is gripped by the chuck mechanism the several feeding elements are returned to the position shown in Fig. 7 ready for the gripping and feeding of the next bolt. The sliding member 231 carried by the pivoted bracket member 228 is provided with an upstanding lug 263 which is adapted to engage the projecting pin 186 and retract the latch 183 to permit the spring fingers to enter the back side of the chute to engage a bolt. When the feeding mechanism is operated to convey the bolt from the chute to horizontal position, latch 183 is carried to closed position by springs 185 as will readily appear from an inspection of Fig. 14.

It has appeared from the foregoing description that each of the operative elements of the present embodiment of our invention are operated automatically and in timed relation with each other. The present machine is designed to have each of such operated elements actuated by the driven pulley 17. The pulley drives through the gear 270 to gear 271 which is carried on a sleeve on the die operating shaft. Such sleeve is journaled in the boss 12 and carries at its outer end a pinion 272 which drives through an idler 273 to a gear 274 on an intermediate shaft 275, also journaled in boss 12. A second intermediate shaft 276 is also journaled in the boss 12 to the rear of shaft 275. On this shaft 276 is mounted a pinion 277 which engages with a spur gear 278 secured to the cam shaft 28. To provide for variations in the relative speed between the tool spindle and the cam shaft which operates the several work holding and feeding mechanisms, we provide a set of removable change gears 280 and 281, which are respectively secured to the outer end of the intermediate shafts 275 and 276.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a machine of the character described, the combination of a housing; a revoluble turret mounted therein; means for intermittently indexing said turret; a plurality of work gripping chucks mounted on one end of said turret, each of said chucks comprising a pair of pivoted gripping jaws; a toggle connecting said jaws and a spring pressed rod acting on said toggle to keep the jaws normally closed; and an intermittently actuated push-rod adapted to successively engage said rods to open said jaws, said rod having a bearing in said housing.

2. In a machine of the character described, the combination of a work holder and a cooperating forming tool, including a spindle; means for reciprocating said spindle; resilient means acting on said reciprocating means for advancing said spindle; and other resilient means adapted to apply additional force to said reciprocating means during a portion of said advance movement.

3. In a machine of the character described, the combination of a work holder and a cooperating forming tool, including a spindle; means for reciprocating said spindle; resilient means acting on said reciprocating means for advancing said spindle; other resilient means adapted to apply additional force to said reciprocating means during a portion of said advance movement; and adjusting means for limiting the action of said second resilient means.

4. In a machine of the character described, the combination of a work holder and a cooperating forming tool, including a spindle; a pivoted arm for reciprocating said spindle; a tension spring attached to said arm; said spring acting to move said spindle in its advance movement; and a stronger spring also attached to said arm adapted to exert additional force thereon during a portion of such advance movement.

5. In a machine of the character described, the combination of a work holder and a cooperating forming tool, including a spindle, a pivoted arm for reciprocating said spindle; a spring attached to said arm; said spring acting to advance said spindle; a stronger spring also attached to said arm adapted to exert additional force thereon during a portion of such advance movement; and adjusting means for limiting the action of said stronger spring.

6. In a machine of the character described, the combination of a work holder and a cooperating forming tool, including a spindle; a pivoted arm for reciprocating said spindle; a spring attached to said arm; said spring acting to advance said spindle; a stronger spring also attached to said arm adapted to exert additional force thereon during a portion of such advance movement; and a cam member acting on said arm to move said spindle in the opposite direction.

7. In a machine of the character described, the combination of a work holder and a cooperating forming tool, including a spindle; a pivoted arm for reciprocating said spindle; a spring attached to said arm; said spring acting to advance said spindle; a stronger spring also attached to said arm adapted to exert additional force thereon during a portion of such advance movement; adjusting means for limiting the action of said stronger spring; and a cam member acting on said arm to move said spindle in the opposite direction.

8. In a machine of the character described, the combination of a rotating spindle having thread-cutting mechanism thereon; a pivoted arm for reciprocating said spindle; a lead cam cooperating with said arm to limit the advance movement thereof; resilient means acting to keep said arm in engagement with said cam; and other resilient means adapted to exert additional force on said arm during a portion of the advance movement of said spindle.

9. In a machine of the character described, the combination of a rotating spindle having thread-cutting mechanism thereon; a pivoted arm for reciprocating said spindle; a lead cam cooperating with said arm to limit the advance movement thereof; resilient means acting to keep said arm in engagement with said cam; other resilient means adapted to exert additional force on said arm during a portion of the advance movement of said spindle; and means adjustable longitudinally of said spindle for limiting the action of said second resilient means.

10. In a machine of the character described, the combination of a work holder and a cooperating forming tool, including a spindle; a pivoted arm for reciprocating said spindle; resilient means for moving said arm to advance said spindle; a cam member engaging said arm to provide proper lead to the advance movement of said spindle; and other resilient means adapted to exert additional force on said arm during the first part of such advance movement.

11. In a machine of the character described, the combination of a work holder and a cooperating forming tool, including a spindle; a pivoted arm for reciprocating said spindle; resilient means for moving said arm to advance said spindle; a cam member engaging said arm to provide proper lead to the advance movement of said spindle; other resilient means adapted to exert additional force on said arm during the first part of such advance movement; and means adjustable longitudinally of said spindle for limiting the action of said second resilient means.

12. In a machine of the character described, the combination of a work holder and a cooperating forming tool, including a spindle; a pivoted arm for reciprocating said spindle; resilient means for moving said arm to advance said spindle; a cam member engaging said arm to provide proper lead to the advance movement of said spindle; other resilient means adapted to exert additional force on said arm during the first part of such advance movement; means adjustable longitudinally of said spindle for limiting the action of said second resilient means and means on said cam for retracting said spindle.

13. In a machine of the character described, the combination of a spindle having thread-cutting mechanism thereon; resilient means adapted to move said spindle to engage a blank positioned in longitudinal alignment therewith; and other resilient means acting to exert additional force to the advance movement of said spindle, such second resilient means acting only until the threading means is engaged with the blank.

14. The combination with a reciprocating tool spindle having a forming tool mounted thereon; of a chip guard mounted about said forming tool; said guard being actuated to move forward at a faster rate of speed than the tool.

15. The combination with a reciprocating tool spindle having a forming tool mounted thereon; of a chip guard enclosing said forming tool; said guard being actuated to move in advance of said tool during the forming operation and to be withdrawn from the point of operation during the retracting of said tool.

16. The combination with a tool spindle having a forming tool mounted thereon; means for reciprocating said spindle; of a chip guard adapted to enclose said forming tool; and means actuated by said reciprocating means for advancing said guard at a faster rate of speed than that of the spindle during the advance of the latter.

17. The combination with a tool spindle having a forming tool mounted thereon; a pivoted arm for reciprocating said spindle; of a chip guard adapted to enclose said forming tool; and means actuated by said arm to accelerate the movement of said guard in advance of the tool during the forming operation.

Signed by us this 7th day of October, 1924.
FRANKLIN O. ANDREWS.
LOUIS STEINFURTH.